Oct. 27, 1931. R. B. BARTELS 1,829,496
METHOD OF MANUFACTURING SHOE SHANK STIFFENERS
Filed May 8, 1929 2 Sheets-Sheet 1
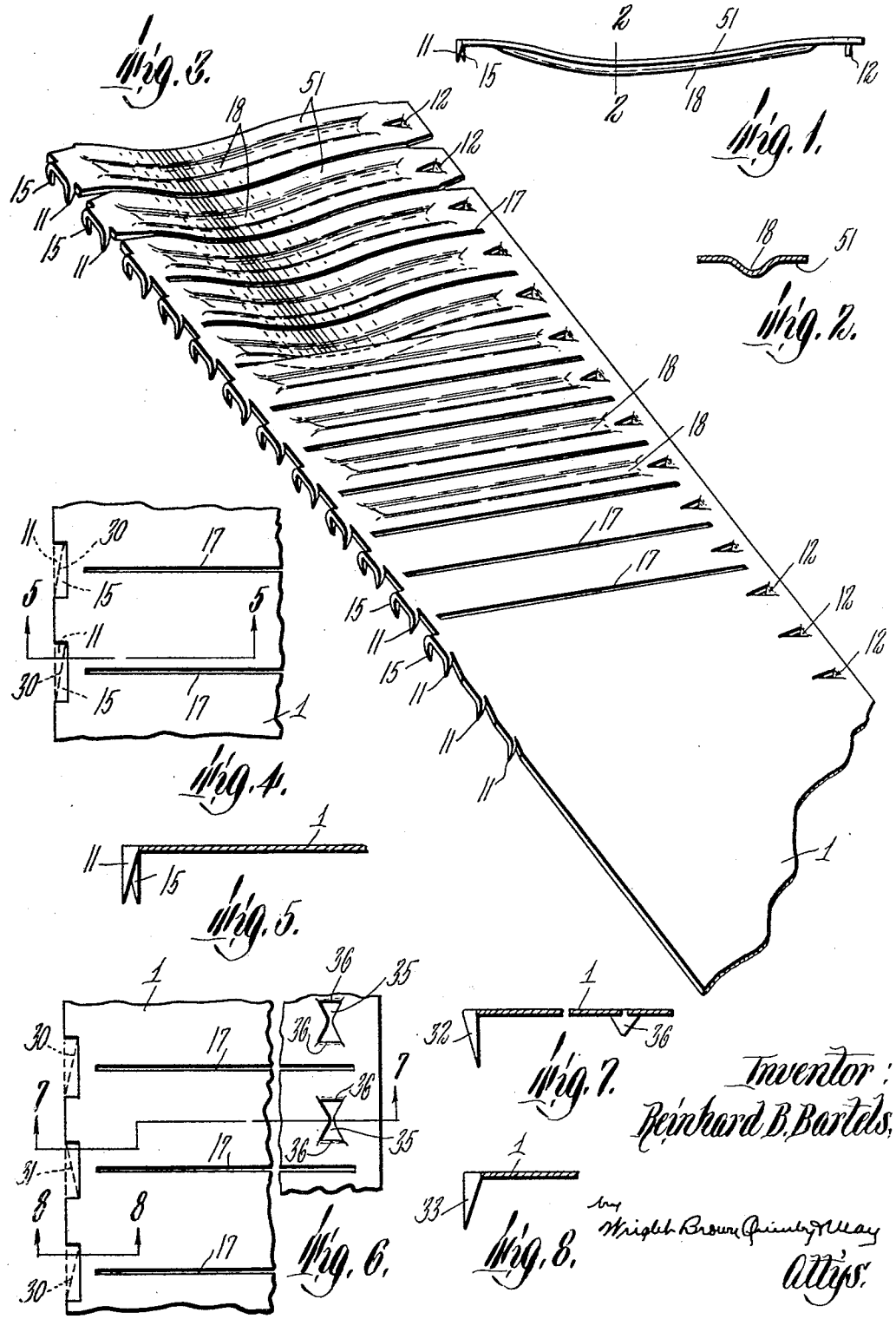
Inventor:
Reinhard B. Bartels, Oct. 27, 1931.　　　　R. B. BARTELS　　　1,829,496
METHOD OF MANUFACTURING SHOE SHANK STIFFENERS
Filed May 8, 1929　　　2 Sheets-Sheet 2
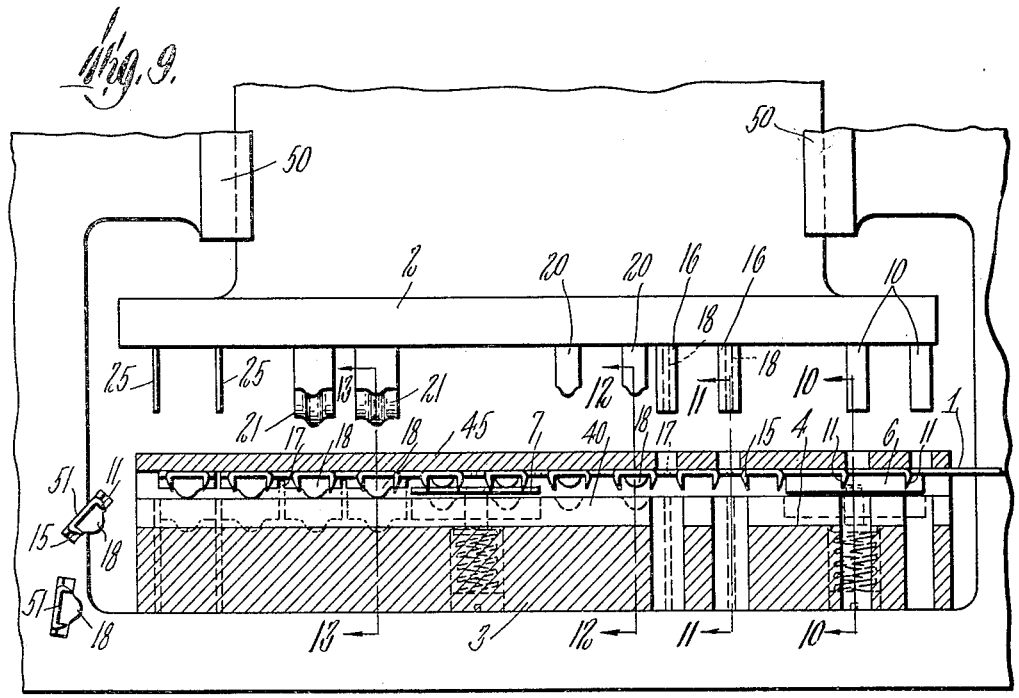
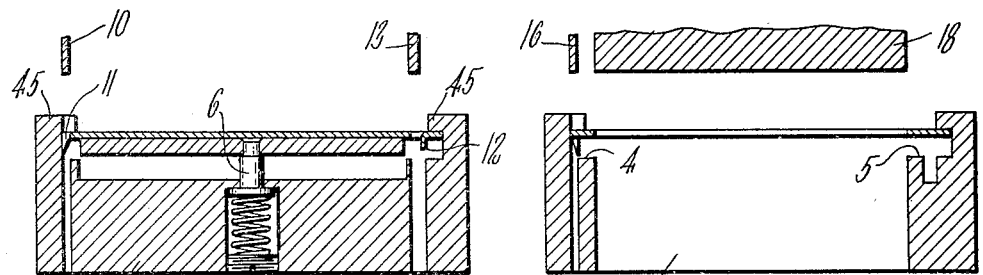
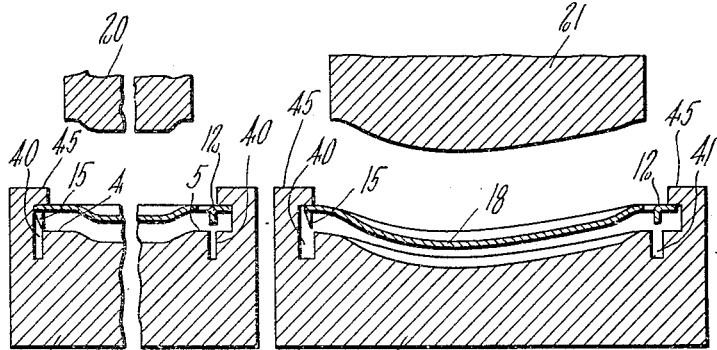
Inventor:
Reinhard B. Bartels,

Patented Oct. 27, 1931

1,829,496

UNITED STATES PATENT OFFICE

REINHARD B. BARTELS, OF MELROSE, MASSACHUSETTS

METHOD OF MANUFACTURING SHOE SHANK STIFFENERS

Application filed May 8, 1929. Serial No. 361,390.

Heretofore it has been customary to make metallic shank stiffeners for shoes, when the stiffeners are provided with integral attaching prongs, by cutting them from strip stock, of the width of the stiffeners. The attaching prongs, more particularly those of substantial length which must be bent to securely clinch when they are driven into the sole member as at the forward ends of stiffeners for welt or McKay shoes, are cut lengthwise of the strip so that they bend crosswise of the grain of the metal which is produced when it is rolled into sheet form. The narrow width stock is, however, more expensive weight for weight than wider strip stock, since more operations are required to reduce it to narrow condition. If, however, it be attempted to cut this same form of stiffener widthwise from a relatively wide strip, not only is there considerable waste at the edge or edges where the prongs are formed, but these prongs extend across the grain of the metal and are much less able to withstand bending in the clinching operation without breaking. If, in order to overcome this liabilty to breakage of the prongs a relatively soft metal is used, this is considerably more expensive than the harder metal, as it must be subjected to annealing, and further, a greater weight of such softer metal is necessary for the same degree of stiffness of the stiffener. If these relatively long prongs are cut from the body of the stiffener widthwise so that they may be bent across the metal grain, so much of the metal is cut away that the stiffener is liable to break off at the prongs. These drawbacks to the use of wide stock have therefore heretofore prevented its use for the manufacture of integral pronged stiffeners.

This invention has for an object the production of a pronged stiffener which is particularly suitable for cutting widthwise from wide strip stock and wherein the long prongs bend across the grain when being clinched, but which are so constructed that the stiffener is not unduly weakened where the prongs are formed. To this end, each prong is cut from the stock of two adjacent side by side stiffener portions of the strip so that each prong may be of a length equal to one-half the width of the stiffener and yet leave one-half of the width of the stiffener at the prongs uncut. Not only does this construction make possible the cutting of the stiffeners widthwise, but in the case of a stiffener provided with a central longitudinal stiffening rib formed by a lateral bending of the stiffener, it makes possible the successful use of stock harder and less expensive than heretofore required for lengthwise cut stiffeners, since in the lengthwise cut stiffeners the rib is formed by bending the metal with the grain, which is likely to cause cracking if the harder stock is used, while in the cross cut stiffeners this rib is formed by bending across the grain.

For a more complete understanding of this invention, reference may be had to the accompanying drawings in which Figure 1 is a side elevation of a finished stiffener.

Figure 2 is a cross section on line 2—2 of Figure 1.

Figure 3 is a perspective of the wide sheet showing successive stages of the cutting and forming of stiffeners therefrom.

Figure 4 is a fragmentary plan of one portion of a strip showing one arrangement of the prongs.

Figure 5 is a detail section on line 5—5 of Figure 4.

Figure 6 is a fragmentary plan showing a different arrangement of the prongs.

Figures 7 and 8 are detail sections on lines 7—7 and 8—8, respectively, of Figure 5.

Figure 9 is a view partly in elevation and partly in section of a die for cutting and forming the strip as shown in Figure 3.

Figures 10 to 13 are detail sections on the correspondingly marked section lines of Figure 9.

Referring to these drawings, at 1 is indicated a strip of sheet metal from which the stiffeners are to be cut, this strip being of a width substantially equal to the length of the desired stiffeners. This strip is passed between the die members 2 and 3 shown in Figures 9 to 13. The die member 3 is provided with supporting ledges 4 and 5 along opposite sides and is also provided with upwardly spring pressed stripper members 6 and 7 which act to lift the strip from contact with the portions 4 and 5 when the upper die member 2 is elevated. The die as shown is intended to perform the same operations on two stiffener blank portions simultaneously. The first operation performed consists in forming certain of the attaching prongs. For this purpose the upper die member 2 is provided at one end with cutting and bending elements 10, which on the descent of the upper die member 2 cut and strike from one edge portion of the sheet metal strip 1 downwardly extending prongs 11. Adjacent to the opposite margin of the sheet 1 other attaching means for the stiffener may also be formed at the same time. One form of such attaching means comprises the relatively short prongs 12 which are struck from the sheet 1 by means of the upper die portion 13 (see Figures 3 and 10). At the next station the material lapping at one side of each of the portions from which the prongs 11 were struck is struck down in the opposite direction, thus to form prongs 15, the upper die member 2 having cutting elements 16 for this purpose. At the same time that the second set of prongs are struck, the strip may be partially cut laterally, as by means of the slits 17 formed by the cutters 18 of the upper die member, leaving uncut marginal portions. These slits 17 are made opposite to the central portions of the side by side lapping lengths of material from which the prongs 11 and 15 are formed and define opposite edges of the strip sections for the individual stiffeners being formed.

At the next station the partially cut strip sections are molded to form a central longitudinally extending stiffening rib as at 18, the upper die member 2 being provided with molding elements 20 for this purpose. These ribs may be made either side up. It is then desirable to have one or more vacant stations after which the partially severed strips are molded to their desired longitudinal curvatures, the upper die member 2 being provided with molding members 21 for this purpose. A space between this longitudinal molding and the operations previously performed is desirable, since this longitudinal molding causes a drawing in of the edges of the strip 1 and it is desirable that this drawing in be accomplished without affecting in any way the die portions for performing the previous operations. After the partially severed sections have thus been molded to the desired longitudinal curvature they are completely severed to form stiffeners as by means of the cutters 25 carried by the upper die member.

The prongs 11 and 15 can be cut as shown in Figures 4 or 5, all the diagonal lines of severance 30 between the portions struck out extending in parallel relation. When the stiffeners are so cut the points of the prongs are offset from each other lengthwise of the stiffener, as shown in Figure 5, each stiffener having its prongs 11 and 15 arranged in the same relation thereto as all the others. Instead of so cutting the prongs, the diagonal cuts may be alternately reversely positioned as shown at 30 and 31 in Figure 6. In this case both prongs of each stiffener come opposite to each other lengthwise of the stiffener, but those of one stiffener have their diagonal edges facing outwardly toward the adjacent end of the stiffeners as shown at 32 in Figure 7 and the stiffeners cut from the strip portions next adjacent thereto have the diagonal sides of the prongs inwardly facing as at 33 in Figure 8. In both cases, however, it will be noted that one-half the length of each prong is cut from the stock of the next adjacent strip portion thereto, so that these prongs may be made each of a length of one-half the width of the strip portion and yet between the opposed prongs of each strip portion there is left an uncut space equal in width to the length of each of the long prongs and so equal in length to one-half the width of the completed stiffener. Moreover, as the grain of the metal runs lengthwise of the strip 1, the line of bending of each of these prongs is transverse to the line of this grain so that the prongs can be bent, when the stiffener is fixed to the sole member by clinching the prongs over, without danger of breakage. These relatively long prongs should be placed at the forward ends of the stiffeners which are to be used for welt or McKay shoes. The rear end fastening means for the stiffeners is not required to be so secure, since this portion comes over the heel and is securely fixed by the neighboring portions of the shoe. A relatively short prong which it is not necessary to clinch in the material is therefore all that is necessary. These short prongs may be formed in various ways, therefore, Figures 6 and 7 showing a different form from that illustrated in Figure 1. Referring to these figures, it will be seen that the material of the stiffener is struck out at 35 in opposite directions to form pairs of short prongs 36.

The lower die member 3 is, of course, formed complementally to the upper die member 2 and is provided with suitable grooves 40 within which the prongs may be bent by the action of the upper die members 10 and 16 and within which they may be positioned when the strip material is carried downwardly against the pressure of the strippers 6 and 7 at each downward stroke of the die member 1. At the opposite side of the die member 3 may also be formed suitable depressions or grooves 41 shaped to receive the fastening prongs struck from the opposite edge portion of the sheet. The lower die member 3 may also be provided with inwardly projecting marginal upper walls 45 to limit the upward movement of the strip as raised by the strippers when the upper die member 2 is in its raised position as shown in Figure 9. The lower die member may also be provided with vertical guideways 50 to guide the motion of the upper die member 2.

Each of the completed stiffener members, it will be seen, comprises a laterally extending strip section 51 cut from the relatively wide strip 1, and has a centrally depressed reinforcing rib 18, a pair of spaced relatively long integral attaching prongs 11 and 15 at one end bent from portions of greater width than the body portion of the stiffener and relatively short integral attaching prongs 12 adjacent to its opposite end. If it were attempted to strike the long prongs from the material of the width of one individual strip portion there would be insufficient material to make these prongs of the necessary length. As the strip material 1 as commercially made varies slightly in width, it should be fed into the die pressed against the left hand edge as viewed in Figures 10 to 13, so that the prongs 11 and 15 may all be of full size. The prongs at the opposite end of the stiffener being formed slightly inwardly from the end of the stiffener and inwardly from the edge of the strip 1 are therefore not affected by the slight commercial variations in width of the strip 1.

From the description of certain embodiments of the stiffener, together with a method and means by which such stiffeners may be formed, it should be evident to those skilled in the art that various changes and modifications might be made therein without departing from the spirit or scope of this invention as defined by the appended claims.

I claim:

1. The step in the manufacture of shoe shank stiffeners with integral prongs, said stiffeners comprising strip portions severed widthwise from a strip of a width substantially equal to the length of the stiffeners, which comprises striking each of said prongs from stock of its strip portion and from that next adjacent thereto, the material of the prongs for adjacent strip portions extending past each other in side by side lapping relation before the prongs are struck.

2. The method of making shoe shank stiffeners, which comprises striking integral attaching prongs from side by side lapping oppositely extending lengthwise portions at intervals along the length of a strip of a width substantially equal to the length of the stiffener, and severing the strip laterally into stiffener strips along lines substantially centrally of said lapping portions.

3. The method of making shoe shank stiffeners, which comprises striking integral attaching prongs from side by side lapping oppositely extending lengthwise portions at intervals and at the edge portion of a strip of a width substantially equal to the length of the stiffeners, severing the strip laterally between uncut margins along lines substantially centrally of said lapping portions, molding each partly severed section to the desired lateral and longitudinal curvatures of the stiffener, and then completing the severing of said sections from each other.

4. The method of making shoe shank stiffeners, which comprises striking integral attaching prongs from side by side lapping oppositely extending lengthwise portions at intervals and at the edge portion of a strip of a width substantially equal to the length of the stiffeners, partially severing the strip laterally along lines substantially centrally of said lapping portions, forming a central longitudinally extending rib in each of said partially severed sections, molding each of said sections to a longitudinal curvature, and then completing the severing of said sections from each other to form stiffeners.

In testimony whereof I have affixed my signature.

REINHARD B. BARTELS.